US008964431B2

(12) United States Patent
Sato et al.

(10) Patent No.: US 8,964,431 B2
(45) Date of Patent: Feb. 24, 2015

(54) POWER CONVERSION SYSTEM (75) Inventors: Eduardo Kazuhide Sato, Minato-ku (JP); Masahiro Kinoshita, Minato-ku (JP); Yushin Yamamoto, Minato-ku (JP); Tatsuaki Amboh, Minato-ku (JP); Katsumi Ikeda, Chiyoda-ku (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 392 days.

(21) Appl. No.: 13/498,515

(22) PCT Filed: Sep. 30, 2009

(86) PCT No.: PCT/JP2009/067071
§ 371 (c)(1),
(2), (4) Date: May 4, 2012

(87) PCT Pub. No.: WO2011/039865
PCT Pub. Date: Apr. 7, 2011

(65) Prior Publication Data
US 2012/0218790 A1 Aug. 30, 2012

(51) Int. Cl.
*H02M 7/48* (2006.01)
*H02J 1/10* (2006.01)
*H02M 7/493* (2007.01)

(52) U.S. Cl.
CPC .................................. *H02M 7/493* (2013.01)
USPC .............................................. 363/71; 307/58

(58) Field of Classification Search
CPC ....................................................... H02M 7/493
USPC ............................. 363/65, 71; 307/53, 55, 58
See application file for complete search history.

(56) References Cited

U.S. PATENT DOCUMENTS 5,257,180 A 10/1993 Sashida et al.
6,381,157 B2 * 4/2002 Jensen ............................ 363/71
(Continued)

FOREIGN PATENT DOCUMENTS

CN 1424796 A 6/2003
JP 63 15670 1/1988
(Continued)

OTHER PUBLICATIONS

Combined Office Action and Search Report issued on Jan. 17, 2014, in Chinese Patent Application No. 200980161803.2 (with partial English translation and English translation of category of cited documents).
Korean Office Action Issued May 22, 2013 in Patent Application No. 10-2012-7010496 (with English translation).
International Search Report Issued Dec. 8, 2009 in PCT/JP09/67071 Filed Sep. 30, 2009.

*Primary Examiner* — Matthew Nguyen
(74) *Attorney, Agent, or Firm* — Oblon, Spivak, McClelland, Maier & Neustadt, L.L.P.

(57) ABSTRACT

A power conversion system includes n (n being an integer of 2 or more) power conversion devices (P1 to P4) connected in parallel to a load (4); and a communication line (2) connected to the n power conversion devices (P1 to P4). Each of power conversion devices includes a communication circuit (10) which transmits a load current value detected by a current sensor (37) to each of other (n−1) power conversion devices through the communication line (2), and receives (n−1) load current values transmitted through the communication line (2) from other (n−1) power conversion devices; and an operation circuit (11) calculating a shared current and a cross current of the corresponding power conversion device based on the n load current values. Accordingly, a wiring line is prevented from becoming complicated even when the number of power conversion devices is increased.

3 Claims, 8 Drawing Sheets

(56) References Cited

U.S. PATENT DOCUMENTS

| | | | |
|---|---|---|---|
| 8,552,589 B2 * | 10/2013 | Ghosh et al. .................... 307/64 |
| 2003/0141907 A1 | 7/2003 | Canova et al. |
| 2011/0049991 A1 | 3/2011 | Sato et al. |
| 2011/0103106 A1 | 5/2011 | Sato et al. |
| 2011/0127837 A1 | 6/2011 | Sato et al. |
| 2011/0134672 A1 | 6/2011 | Sato et al. |
| 2011/0170322 A1 | 7/2011 | Sato et al. |
| 2011/0299307 A1 | 12/2011 | Sato et al. |
| 2012/0013193 A1 | 1/2012 | Sato et al. |
| 2013/0002016 A1 * | 1/2013 | Furukawa et al. ............. 307/9.1 |

FOREIGN PATENT DOCUMENTS

| | | |
|---|---|---|
| JP | 5-15069 A | 1/1993 |
| JP | 5 15070 | 1/1993 |
| JP | 2000 152506 | 5/2000 |
| JP | 2002 238264 | 8/2002 |
| JP | 2006 42530 | 2/2006 |
| KR | 10-2009-00968 A1 | 9/2009 |

* cited by examiner

POWER CONVERSION SYSTEM

TECHNICAL FIELD

The present invention relates to a power conversion system, and particularly to a power conversion system provided with a plurality of power conversion devices connected in parallel to a load.

BACKGROUND ART

There is a conventionally known power conversion system provided with a plurality of power conversion devices connected in parallel to a load. In such a power conversion system, a cross current may flow between the power conversion devices in the case where the output voltages of the plurality of power conversion devices match each other. In order to reduce this cross current, each power conversion device in the conventional power conversion system includes a current sensor detecting a load current value of the corresponding power conversion device, an operation circuit calculating a shared current and a cross current of the corresponding power conversion device based on the load current values of the plurality of power conversion devices, and a control circuit controlling an inverter such that the shared current is supplied from the corresponding power conversion device to a load and the cross current is eliminated (for example, see Patent Literature 1).

CITATION LIST

Patent Literature

PTL 1: Japanese Patent Laying-Open No. 05-15070

SUMMARY OF INVENTION

Technical Problem

However, in the conventional power conversion system, since the operation circuit of each of the power conversion devices is connected via a signal line to the current sensor of each of other power conversion devices, the number of signal lines is increased as the number of power conversion devices is increased. This poses a problem that the wiring between the power conversion devices becomes complicated.

Therefore, a main object of the present invention is to provide a power conversion system that allows a simplified wiring configuration even when the number of power conversion devices is increased.

Solution to Problem

The power conversion system according to the present invention includes n (n being an integer of 2 or more) power conversion devices connected in parallel to a load; and a communication line connected to the n power conversion devices. Each of the power conversion devices includes an inverter converting direct-current (DC) power into alternating-current (AC) power and supplying the AC power to the load, a current sensor detecting a load current value, a communication circuit transmitting the load current value detected by the current sensor to each of other (n−1) power conversion devices through the communication line and receiving (n−1) load current values transmitted through the communication line from the other (n−1) power conversion devices, an operation circuit calculating a shared current and a cross current of a corresponding one of the power conversion devices based on the load current value detected by the corresponding current sensor and the (n−1) load current values received by the communication circuit, and a control circuit controlling the inverter such that the shared current is supplied from the corresponding one of the power conversion devices to the load and the cross current is eliminated.

Preferably, the communication line includes a first connector and a second connector provided corresponding to each of the power conversion devices and connected to the communication circuit of the corresponding one of the power conversion devices; and (n−1) multicore cables provided between the n power conversion devices. Each of the multicore cables has one end connected to the first connector corresponding to one of two corresponding power conversion devices, and the other end connected to the second connector corresponding to the other of the two corresponding power conversion devices. Each communication circuit transmits the load current value to each of other communication circuits and receives the load current value from each of the other communication circuits, through the (n−1) multicore cables.

Further preferably, each of the first connector and the second connector has 2n terminals. The 2n terminals of the first connector are connected to 2n terminals, respectively, of the second connector and connected to the communication circuit of the corresponding one of the power conversion devices. Each of the multicore cables includes 2n wiring lines. One ends of the 2n wiring lines of each of the multicore cables are connected to the 2n terminals, respectively, of the first connector corresponding to one of two corresponding power conversion devices. The other ends of the 2n wiring lines of each of the multicore cables are connected to the 2n terminals, respectively, of the second connector corresponding to the other of the two corresponding power conversion devices. Each communication circuit transmits a differential signal stream showing the load current value to each of other communication circuits through two terminals assigned in advance among the 2n terminals and receives, through remaining two terminals, a differential signal stream showing the (n−1) load current values from other (n−1) communication circuits.

Further preferably, each communication circuit transmits a beat signal together with the load current value through the communication line to each of other communication circuits. The operation circuit includes an adder adding the load current value detected by the corresponding current sensor and the (n−1) load current values received by the communication circuit, to obtain a sum of the load current values of the n power conversion devices, an operation unit calculating the number of the power conversion devices under operation based on the beat signal transmitted from each of other communication circuits, a divider dividing the sum of the load current values of the n power conversion devices obtained by the adder by the number of the power conversion devices calculated by the operation unit to obtain a shared current value of each of the power conversion devices, and a subtracter subtracting the shared current value from the load current value detected by the current sensor to obtain the cross current.

Advantageous Effects of Invention

In the power conversion system according to the present invention, each of power conversion devices includes a communication circuit which transmits a load current value detected by a current sensor to each of other power conversion devices through a communication line and receives the load current value transmitted through the communication line from each of other power conversion devices. Accordingly, the wiring line is prevented from becoming complicated even when the number of power conversion devices is increased.

DESCRIPTION OF EMBODIMENTS

Figure 1:
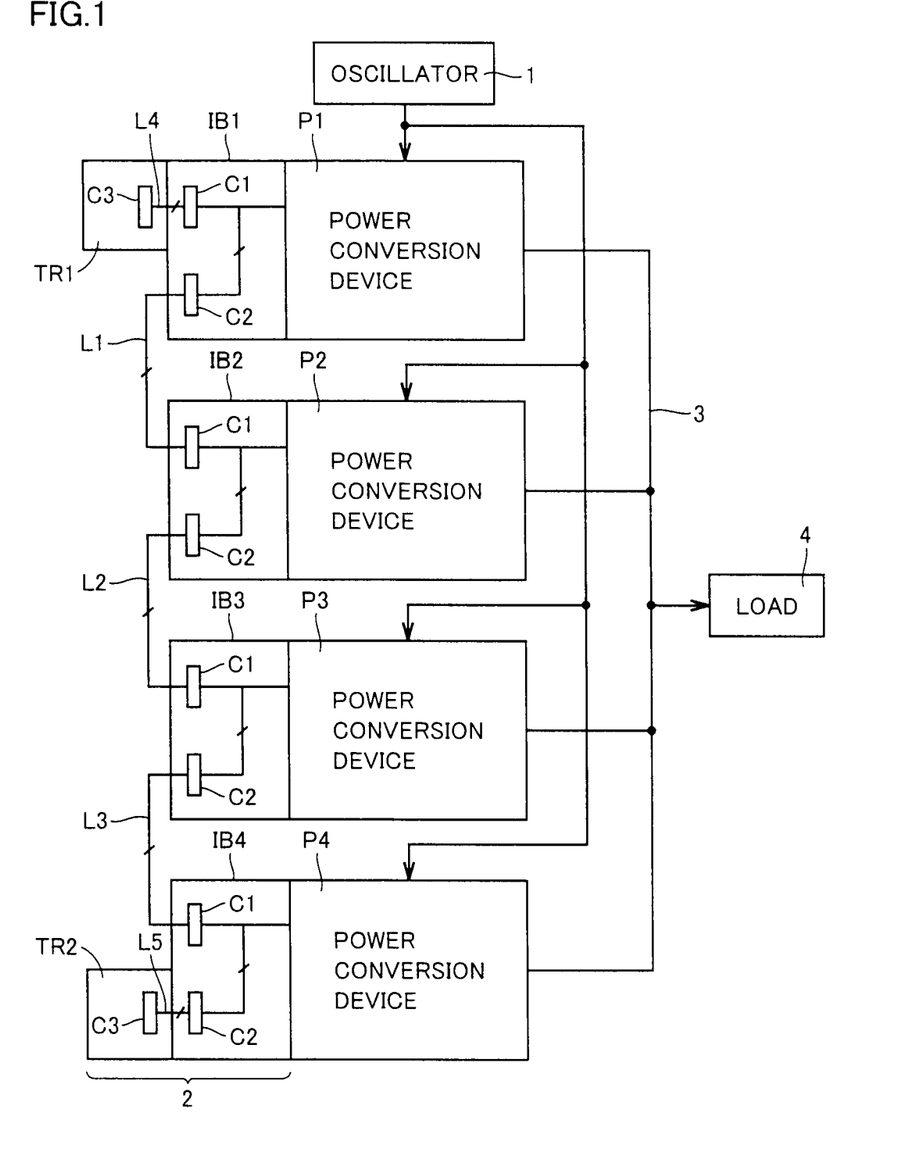
FIG. 1 is a block diagram showing the configuration of a power conversion system according to one embodiment of the present invention.

The power conversion system of the present application includes a plurality of (four in the figure) power conversion devices P1 to P4, an oscillator 1, a communication line 2, and a bus 3, as shown in FIG. 1. Each of power conversion devices P1 to P4 operates in synchronization with the reference signal generated in oscillator 1, converts DC power into AC power, and supplies the AC power to load 4 through bus 3.

Furthermore, each of power conversion devices P1 to P4 detects its own load current value and transmits the detected value to other power conversion devices through communication line 2, and also receives the load current value of each of other power conversion devices through communication line 2. Each of power conversion devices P1 to P4 calculates its own shared current and cross current based on the load current value of each of power conversion devices P1 to P4. Each of power conversion devices P1 to P4 also controls a built-in inverter such that the shared current is supplied to a load 4 and the cross current is eliminated.

Communication line 2 includes four interface boards IB1 to IB4, two terminating resistors TR1, TR2, and five LAN (Local Area Network) cables L1 to L5. Interface boards IB1 to IB4 are fixed to power conversion devices P1 to P4, respectively. Each of interface boards IB1 to IB4 is provided with two connectors C1 and C2. Connectors C1 and C2 each are connected to the corresponding power conversion device through the wiring group formed in the corresponding interface board. Connectors C2 of interface boards IB1 to IB3 are connected to connectors C1 of interface boards IB2 to IB4 through LAN cables L1 to L3, respectively.

Terminating resistors TR1 and TR2 each include a connector C3. Terminating resistors TR1 and TR2 are fixed to interface boards IB1 and IB2, respectively. Connector C3 of terminating resistor TR1 is connected to connector C1 of interface board IB1 through LAN cable L4. Connector C3 of terminating resistor TR2 is connected to connector C2 of interface board IB4 through LAN cable L5.

Figure 2:
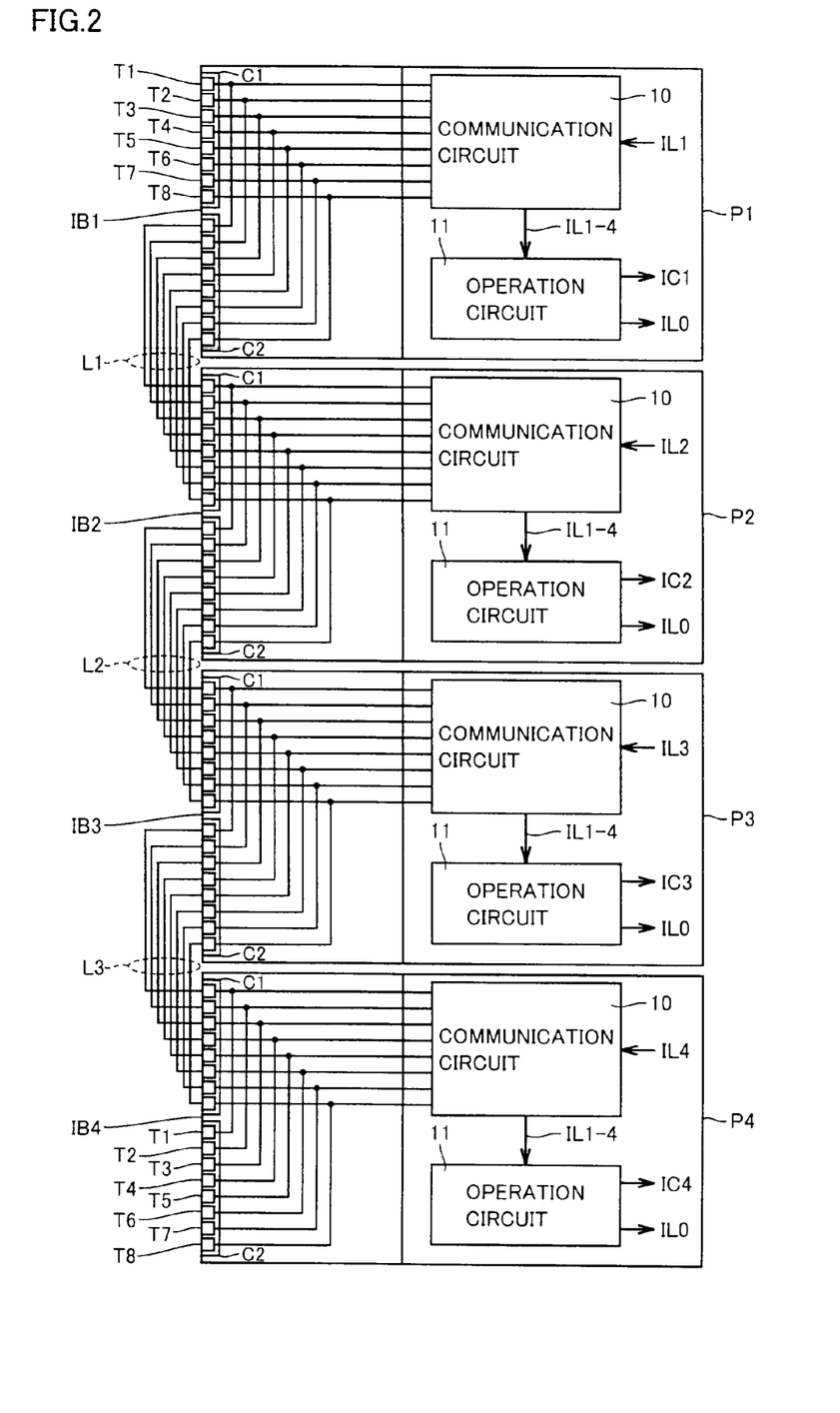
FIG. 2 is a circuit block diagram showing the configuration of an interface board and a main part of the power conversion device shown in FIG. 1.

Each of connectors C1 and C2 includes eight terminals T1 to T8, as shown in FIG. 2. In each of interface boards IB1 to IB4, terminals T1 to T8 of connector C1 are connected to terminals T1 to T8, respectively, of connector C2.

Each of LAN cables L1 to L5 includes eight wiring lines and two plugs provided at both ends of each LAN cable. The plug at one end of LAN cable L1 is inserted into connector C2 of interface board IB1 while the plug at the other end of LAN cable L1 is inserted into connector C1 of interface board IB2.

The plug at one end of LAN cable L2 is inserted into connector C2 of interface board IB2 while the plug at the other end of LAN cable L2 is inserted into connector C1 of interface board IB3. The plug at one end of LAN cable L3 is inserted into connector C2 of interface board IB3 while the plug at the other end of LAN cable L3 is inserted into connector C1 of interface board IB4. Thus, terminals T1 to T8 of connector C1 in each interface board IB are connected to terminals T1 to T8, respectively, of connector C1 in each of other interface boards IB.

Figure 3:
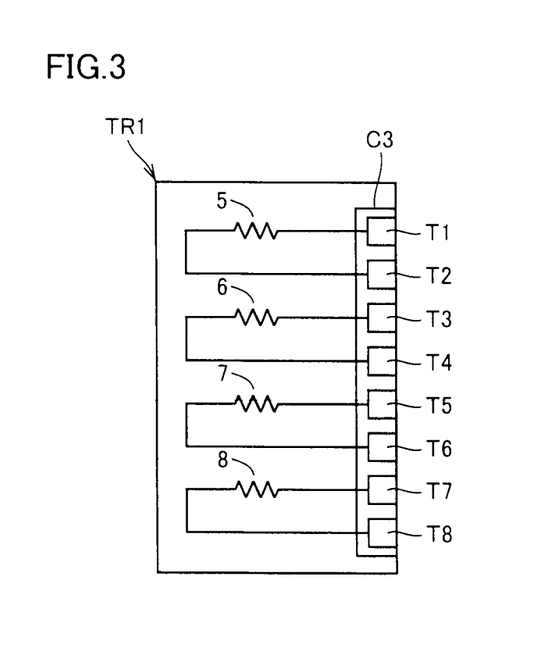
FIG. 3 is a circuit block diagram showing the configuration of a terminating resistor shown in FIG. 1.

Furthermore, connector C3 of terminating resistor TR1 includes eight terminals T1 to T8, as shown in FIG. 3. Terminating resistor TR1 includes four terminating resistor elements 5 to 8. Terminating resistor element 5 is connected between terminals T1 and T2, terminating resistor element 6 is connected between terminals T3 and T4, terminating resistor element 7 is connected between terminals T5 and T6, and terminating resistor element 8 is connected between terminals T7 and T8. The plug at one end of LAN cable L4 is inserted into connector C3 of terminating resistor TR1 while the plug at the other end of LAN cable L4 is inserted into connector C1 of interface board IB1.

Terminating resistor TR2 is identical in configuration to terminating resistor TR1. The plug at one end of LAN cable L5 is inserted into connector C3 of terminating resistor TR2 while the plug at the other end of LAN cable L5 is inserted into connector C2 of interface board IB4. Communication line 2 is configured in this manner.

Referring back to FIG. 2, each of power conversion devices P1 to P4 includes a communication circuit 10 and an operation circuit 11. Communication circuit 10 of power conversion device P1 transmits its own load current value IL1 through terminals T1 and T2 of connector C1 to communication circuit 10 of each of other power conversion devices P2 and P3. Communication circuit 10 of power conversion device P2 transmits its own load current value IL2 through terminals T3 and T4 of connector C1 to communication circuit 10 of each of other power conversion devices P1, P3 and P4.

Communication circuit 10 of power conversion device P1 transmits its own load current value IL3 through terminals T5 and T6 of connector C1 to communication circuit 10 of each of other power conversion devices P1, P2 and P4. Communication circuit 10 of power conversion device P4 transmits its own load current value IL4 through terminals T7 and T8 of connector C1 to communication circuit 10 of each of other power conversion devices P1 to P3.

Furthermore, communication circuit 10 of power conversion device P1 receives load current values IL2 to IL4 transmitted from communication circuit 10 of each of other power conversion devices P2 to P4 through terminals T3 to T8 of connector C1, and then, supplies these load current values IL2 to IL4 and its own load current value IL1 to operation circuit 11. Communication circuit 10 of power conversion device P2 receives load current values IL1, IL3 and IL4 transmitted from communication circuit 10 of each of other power conversion devices P1, P3 and P4 through terminals T1, T2 and T5 to T8 of connector C1, and then, supplies these load current values IL1, IL3 and IL4 and its own load current value IL2 to operation circuit 11.

Communication circuit 10 of power conversion device P3 receives load current values IL1, IL2 and IL4 transmitted from communication circuit 10 of each of other power conversion devices P1, P2 and P4 through terminals T1 to T4, T7, and T8 of connector C1, and then, supplies these load current values IL1, IL2 and IL4 and its own load current value IL3 to operation circuit 11. Communication circuit 10 of power conversion device P4 receives load current values IL1 to IL3 transmitted from communication circuit 10 of each of other power conversion devices P1 to P3 through terminals T1 to T6 of connector C1, and then, supplies these load current values IL1 to IL3 and its own load current value IL4 to operation circuit 11.

Furthermore, operation circuit 11 of power conversion device P1 averages load current values IL1 to IL4 supplied from communication circuit 10 to obtain its own shared current value IL0, and then, subtracts shared current value IL0 from its own load current value IL1 to obtain a cross current IC1. Operation circuit 11 of power conversion device P2 averages load current values IL1 to IL4 supplied from communication circuit 10 to obtain its own shared current value IL0, and then, subtracts shared current value IL0 from its own load current value IL2 to obtain a cross current IC2.

Operation circuit 11 of power conversion device P3 averages load current values IL1 to IL4 supplied from communication circuit 10 to obtain its own shared current value IL0, and then, subtracts shared current value IL0 from its own load current value IL3 to obtain a cross current IC3. Operation circuit 11 of power conversion device P4 averages load current values IL1 to IL4 supplied from communication circuit 10 to obtain its own shared current value IL0, and then, subtracts shared current value IL0 from its own load current value IL4 to obtain a cross current IC4.

Figure 4:
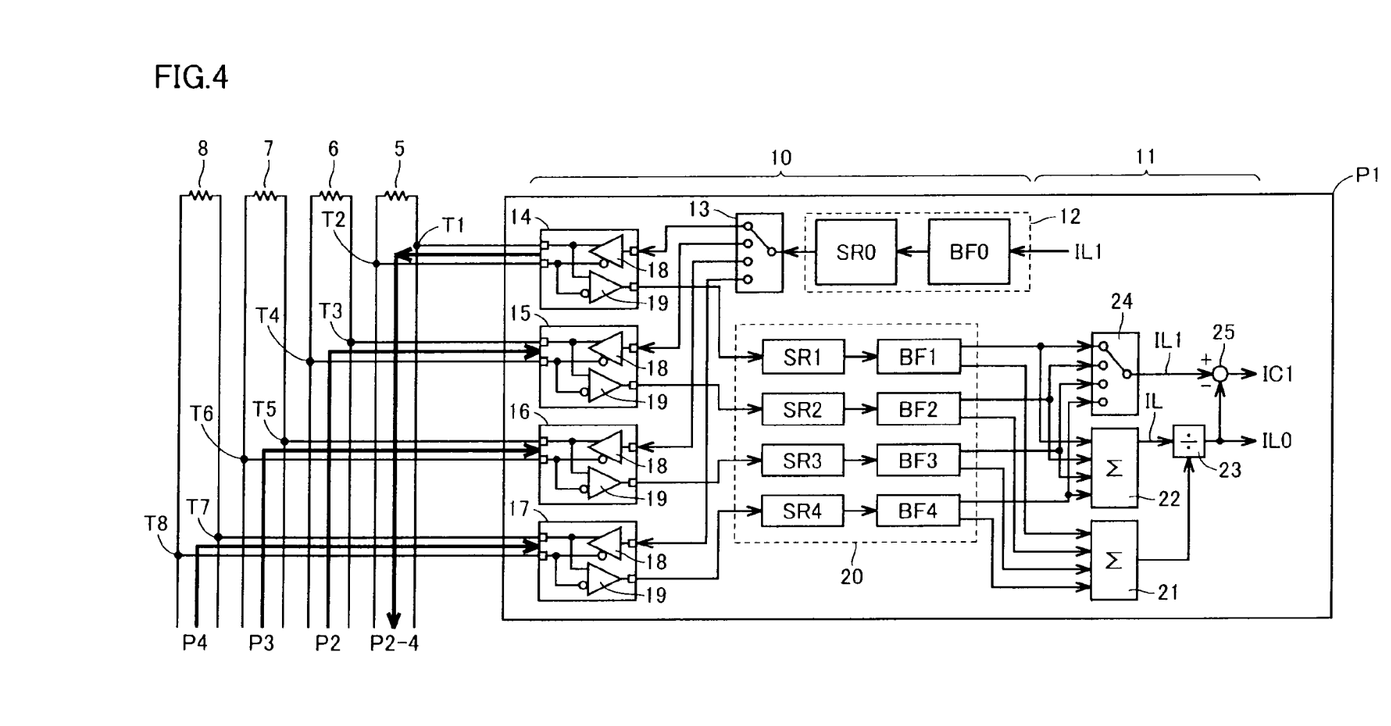
FIG. 4 is a circuit block diagram showing the configuration and the operation of each of a communication circuit and an operation circuit of a power conversion device P1 shown in FIG. 2.

FIG. 4 is a block diagram showing the configuration of communication circuit 10 and operation circuit 11 of power conversion device P1. In FIG. 4, communication circuit 10 includes a transmitting circuit 12, a selector 13, signal conversion circuits 14 to 17, and a receiving circuit 20. Transmitting circuit 12 includes a buffer BF0 and a shift register SR0. A multiple-bit parallel signal (a multiple-bit signal transmitted in parallel) showing load current value IL1 of corresponding power conversion device P1 is input to buffer BF0. Buffer BF0 transmits the multiple-bit parallel signal to shift register SR0. Shift register SR0 converts the multiple-bit parallel signal from buffer BF0 into a multiple-bit serial signal (a multiple-bit signal transmitted in series). The output signal from shift register SR0 is a single-ended signal having one of an "H" level and an "L" level.

Each of signal conversion circuits 14 to 17 includes sub-signal conversion circuits 18 and 19. Sub-signal conversion circuit 18 converts each single-ended signal supplied from shift register SR0 through selector 13 into a differential signal consisting of a pair of mutually complementary signals, and then supplies this differential signal between the corresponding terminal pair of connector C1. Sub-signal conversion circuit 19 converts the differential signal supplied between the corresponding terminal pair of connector C1 into a single-ended signal, and then supplies the signal to receiving circuit 20.

Signal conversion circuits 14 to 17 are provided corresponding to power conversion devices P1 to P4, respectively. Selector 13 supplies the multiple-bit serial signal from shift register SR0 to sub-signal conversion circuit 18 of signal conversion circuit 14 corresponding to corresponding power conversion device P1.

Sub-signal conversion circuit 18 of signal conversion circuit 14 converts each single-ended signal supplied through selector 13 from transmitting circuit 12 into a differential signal, and transmits the differential signal to other power conversion devices P2 to P4 through terminals T1 and T2 of connector C1. Sub-signal conversion circuit 19 of signal conversion circuit 14 also converts each differential signal output from sub-signal conversion circuit 18 to terminals T1 and T2 of connector C1 into a single-ended signal.

Since no signal is input to sub-signal conversion circuit 18 of each of signal conversion circuits 15 to 17, the output node pair of sub-signal conversion circuit 18 of each of signal conversion circuits 15 to 17 is brought into a high impedance state. Sub-signal conversion circuit 19 of signal conversion circuit 15 converts, into a single-ended signal, each differential signal supplied through terminals T3 and T4 of connector C1 from signal conversion circuit 15 of power conversion device P2.

Sub-signal conversion circuit 19 of signal conversion circuit 16 converts, into a single-ended signal, each differential signal supplied through terminals T5 and T6 of connector C1 from signal conversion circuit 16 of power conversion device P3. Sub-signal conversion circuit 19 of signal conversion circuit 17 converts, into a single-ended signal, each differential signal supplied through terminals T7 and T8 of connector C1 from signal conversion circuit 15 of power conversion device P4. Therefore, the output signals from sub-signal conversion circuits 19 of signal conversion circuits 14 to 17 are to be multiple-bit serial signals showing load current values IL1 to IL4, respectively.

Receiving circuit 20 includes shift registers SR1 to SR4 and buffers BF1 to BF4. Shift registers SR1 to SR4 receive output signals from signal conversion circuits 14 to 17, respectively. Each of shift registers SR1 to SR4 converts the multiple-bit serial signal from the corresponding signal conversion circuit into a multiple-bit parallel signal. Buffers BF1 to BF4 receive output signals from shift registers SR1 to SR4, respectively. Each of buffers BF1 to BF4 transmits the multiple-bit parallel signal (that is, a load current value) generated in the corresponding shift register to operation circuit 11.

Operation circuit 11 includes adders 21 and 22, a divider 23, a selector 24, and a subtracter 25. Each multiple-bit parallel signal is added with a beat signal. Adder 21 calculates the number of beat signals output from buffers BF1 to BF4 (that is, number n of power conversion devices P under operation). All of power conversion devices P1 to P4 are being operated, in which case n=4. For example, a failure occurs in one power conversion device P4, in which case n=3.

Adder 22 adds load current values IL1 to IL4 supplied from buffers BF1 to BF4, to calculate a total load current value IL. Divider 23 divides total load current value IL calculated by adder 22 by number n of power conversion devices (for example, four) calculated by adder 21, to obtain a current value IL0=IL/n that should be shared among power conversion devices P1 to P4.

Selector 24 supplies, to subtracter 25, the output signal (that is, load current value IL1) of buffer BF1 among buffers BF1 to BF4 corresponding to corresponding power conversion device P1. Subtracter 25 subtracts shared current value IL0 from load current value IL1 supplied from buffer BF1 through selector 24, to obtain cross current value IC1. Power conversion device P1 controls the built-in inverter such that a current equal to shared current value IL0 is supplied and cross current value IC1 is set to be 0.

Figure 5:
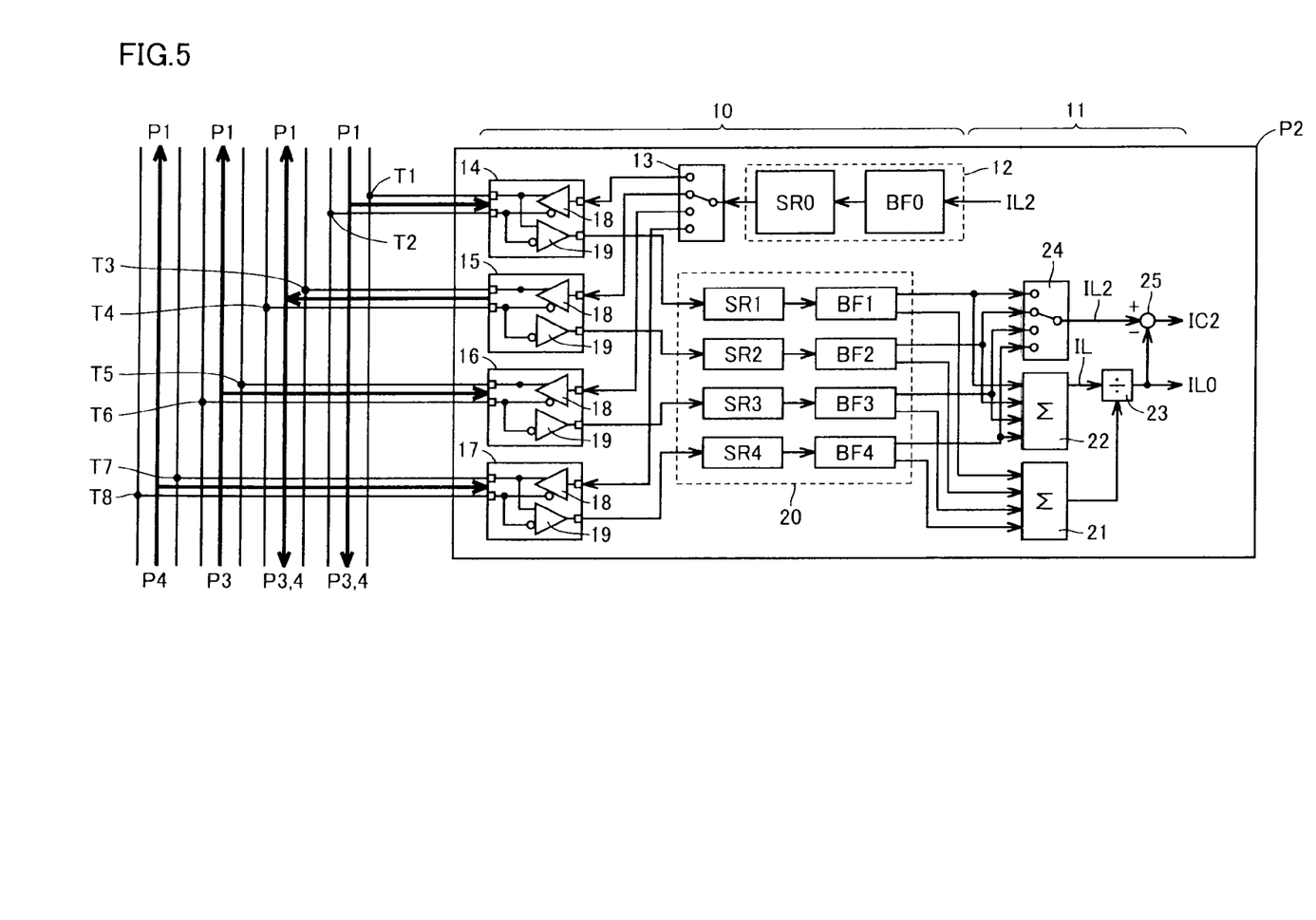
FIG. 5 is a circuit block diagram showing the configuration and the operation of each of a communication circuit and an operation circuit of a power conversion device P2 shown in FIG. 2.

Power conversion devices P2 to P4 are also identical in configuration to power conversion device P1. It is, however, to be noted that selector 13 of power conversion device P2 supplies the multiple-bit serial signal from shift register SR0 to sub-signal conversion circuit 18 of signal conversion circuit 15 corresponding to corresponding power conversion device P2, as shown in FIG. 5. Selector 24 of power conversion device P2 also supplies, to subtracter 25, the output signal (that is, load current value IL2) of buffer BF2 among buffers BF1 to BF4 corresponding to corresponding power conversion device P2. Subtracter 25 subtracts shared current value IL0 from load current value IL2 supplied from buffer BF2 through selector 24 to obtain cross current value IC2. Power conversion device P2 controls the built-in inverter such that a current equal to shared current value IL0 is supplied and cross current value IC2 is set to be 0.

Figure 6:
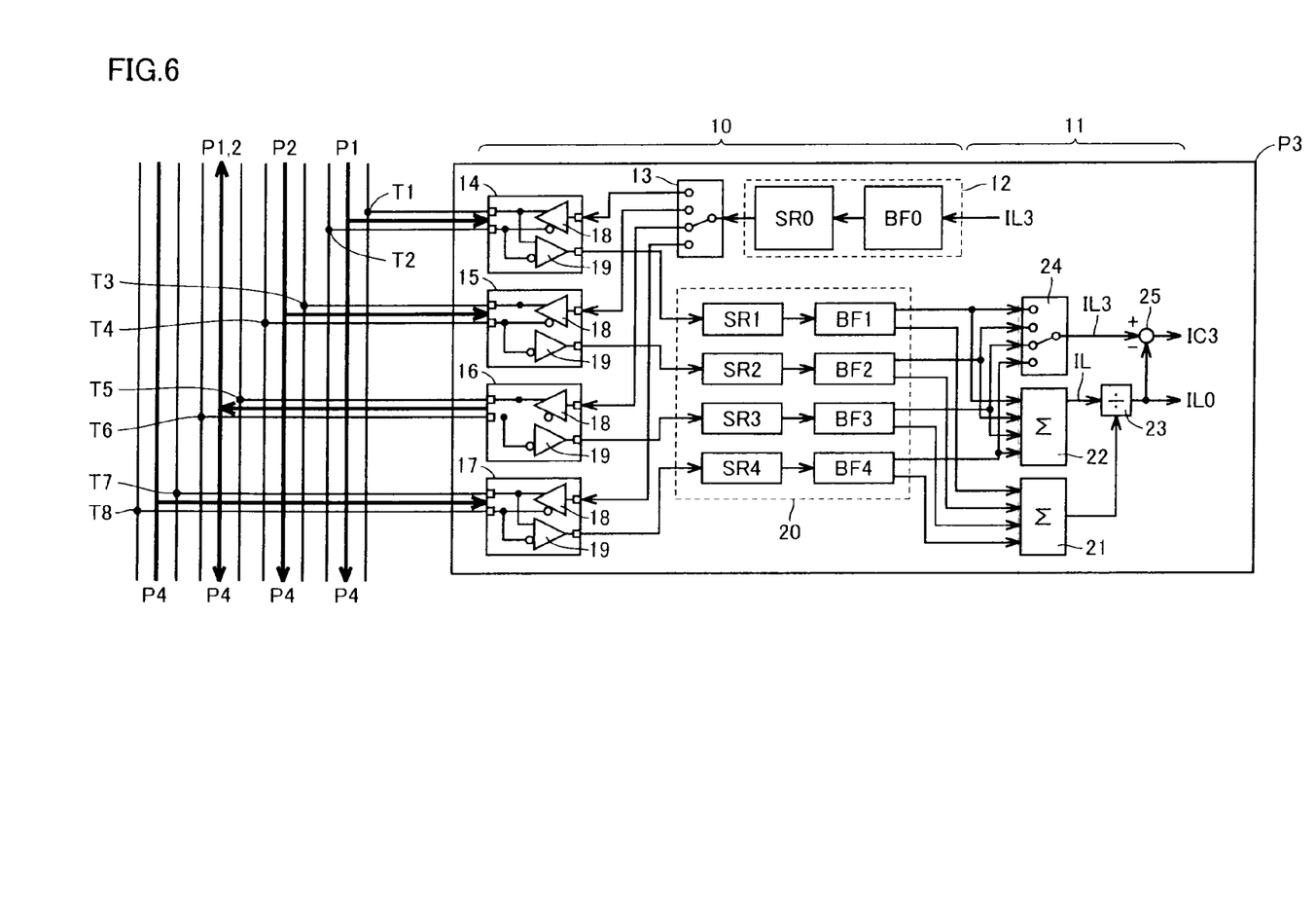
FIG. 6 is a circuit block diagram showing the configuration and the operation of each of a communication circuit and an operation circuit of a power conversion device P3 shown in FIG. 2.

Furthermore, selector 13 of power conversion device P3 supplies the multiple-bit serial signal from shift register SR0 to sub-signal conversion circuit 18 of signal conversion circuit 16 corresponding to corresponding power conversion device P3, as shown in FIG. 6. Selector 24 of power conversion device P3 also supplies, to subtracter 25, the output signal (that is, load current value IL3) of buffer BF3 among buffers BF1 to BF4 corresponding to corresponding power conversion device P3. Subtracter 25 subtracts shared current value IL0 from load current value IL3 supplied from buffer BF3 through selector 24 to obtain cross current value IC3. Power conversion device P3 controls the built-in inverter such that a current equal to shared current value IL0 is supplied and cross current value IC3 is set to be 0.

Figure 7:
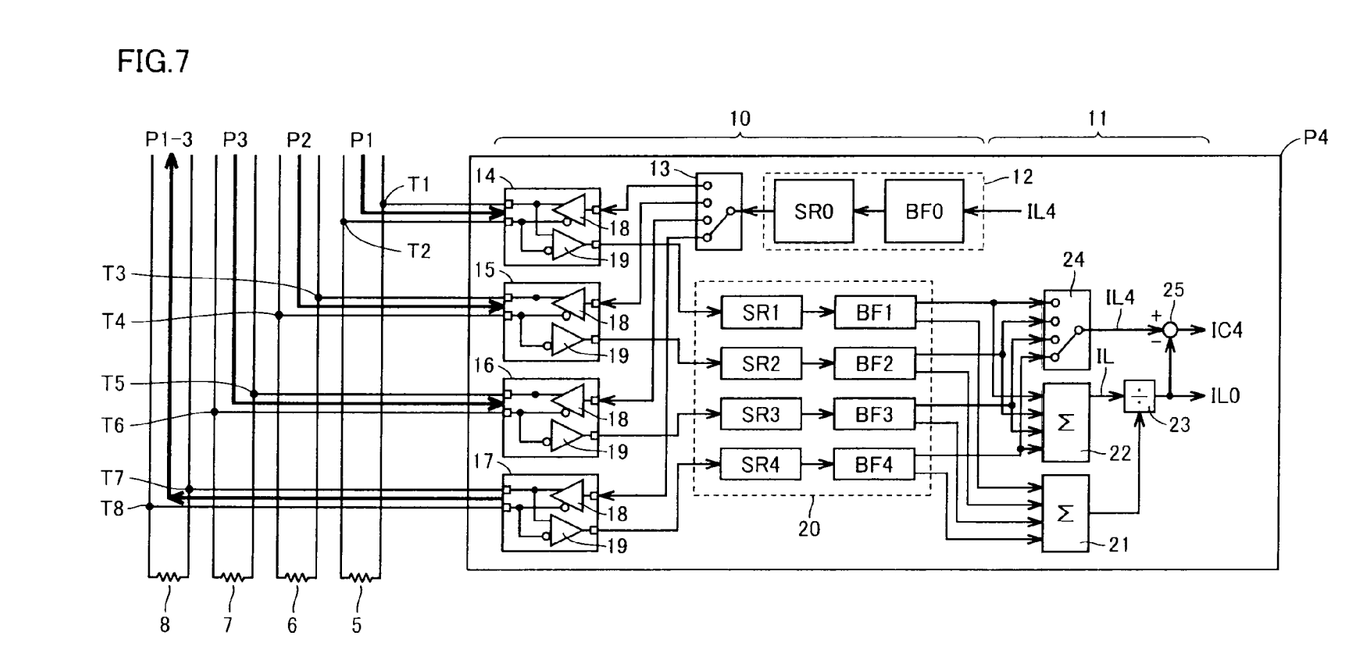
FIG. 7 is a circuit block diagram showing the configuration and the operation of each of a communication circuit and an operation circuit of a power conversion device P4 shown in FIG. 2.

Furthermore, selector 13 of power conversion device P4 supplies the multiple-bit serial signal from shift register SR0 to sub-signal conversion circuit 18 of signal conversion circuit 17 corresponding to corresponding power conversion device P4, as shown in FIG. 7. Selector 24 of power conversion device P2 also supplies, to subtracter 25, the output signal (that is, load current value IL4) of buffer BF4 among buffers BF1 to BF4 corresponding to corresponding power conversion device P4. Subtracter 25 subtracts shared current value IL0 from load current value IL4 supplied from buffer BF4 through selector 24 to obtain cross current value IC4. Power conversion device P4 controls the built-in inverter such that a current equal to shared current value IL0 is supplied and cross current value IC4 is set to be 0.

Figure 8:
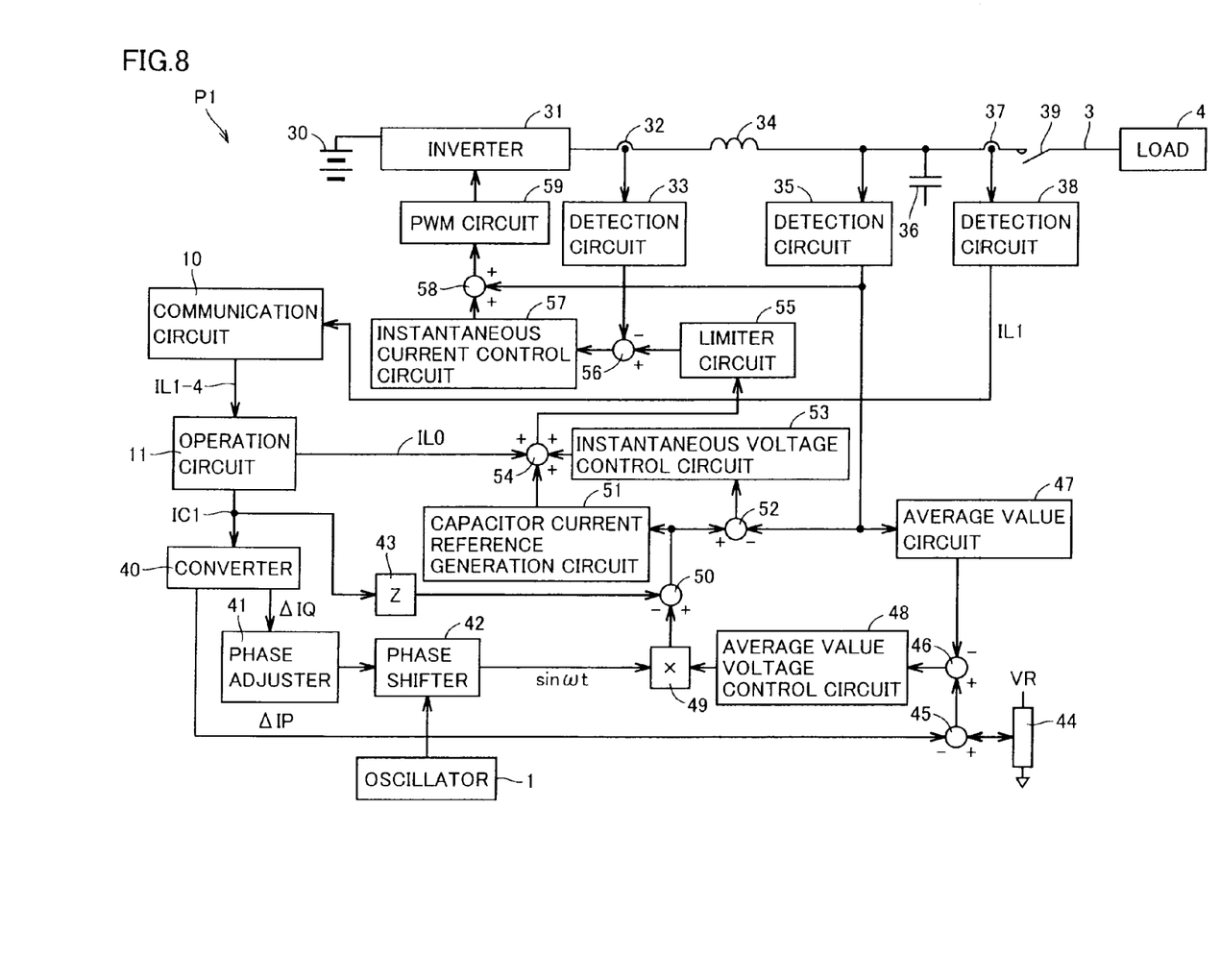
FIG. 8 is a circuit block diagram showing the entire configuration of power conversion device P1 shown in FIG. 1.

FIG. 8 is a circuit block diagram showing the entire configuration of power conversion device P1. In FIG. 8, in addition to communication circuit 10 and operation circuit 11, power conversion device P1 includes a battery 30, an inverter 31, current sensors 32 and 37, detection circuits 33, 35 and 38, a reactor 34, a capacitor 36, and a switch 39.

Battery 30 stores DC power. Inverter 31 converts the DC power supplied from battery 30 into AC power. The AC power generated in inverter 31 is supplied to load 4 through reactor 34, switch 39 and bus 3. Reactor 34 and capacitor 36, which constitute a low pass filter, cause the AC power generated in inverter 31 to pass therethrough and interrupts the signal of a carrier frequency generated in inverter 31.

Current sensor 32 detects the output current of inverter 31. Detection circuit 33 converts the detection value of current sensor 32 into a digital signal. Detection circuit 35 detects a voltage of capacitor 36 (a voltage on bus 3 at the time when switch 39 is turned on), and outputs the digital signal showing the detection value. Current sensor 37 detects load current value IL1. Detection circuit 38 converts load current value IL1 into a digital signal (a multiple-bit parallel signal).

Furthermore, power conversion device P1 includes a converter 40, a phase adjuster 41, a phase shifter 42, and a cross current limiting virtual impedance circuit (Z) 43. Converter 41 converts cross current IC1 into an active component AIP and a reactive component ΔIQ. Phase adjuster 41 generates a phase signal based on reactive component ΔIQ. Phase shifter 42 adjusts the phase of the output signal from oscillator 1 based on the phase signal, and generates a sine wave signal sin ωt used as a phase reference for the output voltage. Cross current limiting virtual impedance circuit 43 virtually inserts an impedance Z between power conversion device P1 and another power conversion device to limit the cross current.

Furthermore, power conversion device P1 includes a voltage setting unit 44, subtracters 45, 46, 50, 52, and 56, an average value circuit 47, an average value voltage control circuit 48, a multiplier 49, a capacitor current reference generation circuit 51, an instantaneous voltage control circuit 53, adders 54 and 58, a limiter circuit 55, an instantaneous current control circuit 57, and a PWM circuit 59.

Voltage setting unit 44 generates a command value of the average value of the output voltage of power conversion device P1. Average value circuit 47 derives an average value of the voltage between the terminals of capacitor 36 based on the output signal from detection circuit 35. Subtracters 45 and 46 subtract active component AIP of cross current IC1 and the output value of average value circuit 47 from the output value of voltage setting unit 44, and then, supplies the resultant to average value voltage control circuit 48. Average value voltage control circuit 48 controls the average value of the output voltage of power conversion device P1 based on the output value of subtracter 46.

Multiplier 49 multiplies sine wave signal sin ωt generated in phase shifter 42 and the output value of average value voltage control circuit 48, to produce an instantaneous voltage command value that should be output from power conversion device P1. Subtracter 50 subtracts the output value of cross current limiting virtual impedance circuit 43 from the output value of multiplier 49, and supplies the resultant to capacitor current reference generation circuit 51. Based on the output value of subtracter 50, capacitor current reference generation circuit 51 outputs the current value that should flow through capacitor 36 for generating a desired output voltage.

Subtracter 52 subtracts the output value of average value circuit 47 from the output value of subtracter 50, and supplies the resultant to instantaneous voltage control circuit 53. Instantaneous voltage control circuit 53 controls the voltage between the terminals of capacitor 36 based on the output value of subtracter 50. Adder 54 adds shared current value IL0, the output value of capacitor current reference generation circuit 51 and the output value of instantaneous voltage control circuit 53. The output value of adder 54 is supplied to subtracter 56 through limiter circuit 55. Limiter circuit 55 limits the output current command value of inverter 31.

Subtracter 56 subtracts the output value of detection circuit 33 from the output value of limiter circuit 55, and supplies the resultant to instantaneous current control circuit 57. Instantaneous current control circuit 57 controls the output current of inverter 31. Adder 58 adds the output value of detection circuit 35 and the output value of instantaneous current control circuit 57, and supplies the resultant value to PWM circuit 59. PWM circuit 59 controls inverter 31 based on the output value of adder 58.

The operation of power conversion device P1 will then be described. Power conversion device P1 is provided with a current minor loop. Thus, instantaneous current control circuit 57 outputs a command value for the voltage that should be applied to reactor 34 such that the output current of inverter 31 subjected to feedback by current sensor 32 matches the current command value from limiter circuit 55. Furthermore, since output bus 3 carries output voltages of capacitor 36 and other power conversion devices, it is necessary for inverter 31 to generate a sum voltage of the voltage on output bus 3 and the voltage that should be applied to reactor 34 in order to apply a desired voltage to reactor 34. Therefore, the voltage value of capacitor 36 detected in detection circuit 35 and the output value of instantaneous current control circuit 57 are added in adder 58, and the output value of adder 58 is applied as a voltage command value to PWM circuit 59.

Furthermore, in accordance with the capacitance value of capacitor 36, capacitor current reference generation circuit 51 generates a sine wave current reference having a phase advanced by 90 degrees with respect to the voltage command value of capacitor 36 as a current that should flow through capacitor 36. The voltage command value of capacitor 36 is obtained from the output value of subtracter 50. Furthermore, instantaneous voltage control circuit 53 receives the deviation (an output value of subtracter 52) between the voltage command value of capacitor 36 and the voltage value of capacitor 36 detected in detection circuit 35, and then, outputs a correction current signal that should be output from inverter 31 in order to reduce this deviation.

The output current command value to inverter 31 is a signal obtained by adding the output value of capacitor current reference generation circuit 51, the output value of instantaneous voltage control circuit 53 and shared current value IL0 by adder 54 and limiting the addition value by limiter circuit 55. Therefore, in the no-load state, inverter 31 supplies a current that should flow through capacitor 36 to thereby establish a no-load voltage. In this case, instantaneous voltage control circuit 53 compensates for an excess or a shortfall of the output from capacitor current reference generation circuit 51 caused by an error in the current control and an error between the design value of the capacitance value of capacitor 36 and the actual value.

Then, when switch 39 is turned on and load 4 is introduced, shared current value IL0 is supplied from operation circuit 11 to the current minor loop such that one fourth of load current IL is shared. Thus, four power conversion devices P1 to P4 each are to share one fourth of load current IL. In this case, limiter circuit 55 limits the command value to instantaneous current control circuit 57 to be equal to or lower than the current tolerance value of inverter 31 so as to prevent inverter 31 from supplying an overcurrent such as an inrush current that occurs at the time of activation of the load.

In this current conversion system, the cross current is suppressed by configuring a control circuit in such a manner as if an impedance exists only in the cross current which flows between inverters 31. Cross current limiting virtual impedance circuit 43 calculates IC1×Z, subtracts this signal from the output value of multiplier 49 by subtracter 50, and sets the resultant as a voltage command value of capacitor 36. The voltage of capacitor 36 instantaneously follows the voltage command value by the above-mentioned voltage control system. Other power conversion devices P2 to P4 are identical in configuration to power conversion device P1. Consequently, each of power conversion devices P1 to P4 supplies shared current IL0 to load 4 while a cross current is eliminated.

In the present embodiment, each power conversion device includes communication circuit 10 which transmits the load current value detected by current sensor 37 through communication line 2 to each of other power conversion devices and receives the load current value transmitted through communication line 2 from each of other power conversion devices. Furthermore, communication line 2 includes interface boards IB1 to IB4 provided in power conversion devices P1 to P4, respectively, and LAN cables L1 to L3 establishing connection among interface boards IB1 to IB4. Therefore, the wiring line is prevented from becoming complicated even when the number of power conversion devices is increased.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

P1 to P4 power conversion device, 1 oscillator, 2 communication line, 3 bus, 4 load, IB1 to IB4 interface board, TR1, TR2 terminating resistor, L1 to L5 LAN cable, C1 to C3 connector, T1 to T8 terminal, 5 to 8 terminating resistor element, 10 communication circuit, 11 operation circuit, 12 transmitting circuit, 13, 24 selector, 14 to 17 signal conversion circuit, 18, 19 sub-signal conversion circuit, 20 receiving circuit, BF0 to BF4 buffer, SR0 to SR4 shift register, 21, 22, 54, 58 adder, 23 divider, 25, 45, 46, 50, 52, 56 subtracter, 30 battery 31 inverter, 32, 37 current sensor, 33, 35 38 detection circuit, 34 reactor 36 capacitor, 39 switch, 40 converter, 41 phase adjuster, 42 phase shifter, 43 cross current limiting virtual impedance circuit, 44 voltage setting unit, 47 average value circuit, 48 average value voltage control circuit, 49 multiplier, 51 current reference generation circuit, 53 instantaneous voltage control circuit. 55 limiter circuit, 57 instantaneous current control circuit, 59 PWM circuit.

The invention claimed is:

1. A power conversion system comprising:
   n (n being an integer of 2 or more) power conversion devices connected in parallel to a load; and
   a communication line connected to said n power conversion devices,
   each of the power conversion devices including
   an inverter converting direct-current (DC) power into alternating-current (AC) power and supplying the AC power to said load,
   a current sensor detecting a load current value,
   a communication circuit transmitting the load current value detected by said current sensor to each of other (n−1) power conversion devices through said communication line and receiving (n−1) load current values transmitted through said communication line from the other (n−1) power conversion devices,
   an operation circuit calculating a shared current and a cross current of a corresponding one of the power conversion devices based on the load current value detected by the corresponding current sensor and said (n−1) load current values received by said communication circuit, and
   a control circuit controlling said inverter such that said shared current is supplied from the corresponding one of the power conversion devices to said load and said cross current is eliminated, wherein said communication line includes
   a first connector and a second connector provided corresponding to each of the power conversion devices and connected to said communication circuit of the corresponding one of the power conversion devices, and (n−1) multicore cables provided between said n power conversion devices, each of the multicore cables has one end connected to the first connector corresponding to one of two corresponding power conversion devices, and the other end connected to the second connector corresponding to the other of the two corresponding power conversion devices, and each communication circuit transmits said load current value to each of other communication circuits and receives the load current value from each of the other communication circuits, through said (n−1) multicore cables.

2. The power conversion system according to claim 1, wherein each of said first connector and said second connector has 2n terminals, the 2n terminals of said first connector are connected to 2n terminals, respectively, of said second connector and connected to said communication circuit of the corresponding one of the power conversion devices, each of the multicore cables includes 2n wiring lines, one ends of the 2n wiring lines of each of the multicore cables are connected to the 2n terminals, respectively, of the first connector corresponding to one of two corresponding power conversion devices, the other ends of the 2n wiring lines of each of the multicore cables are connected to the 2n terminals, respectively, of the second connector corresponding to the other of the two corresponding power conversion devices, and each communication circuit transmits a differential signal stream showing said load current value to each of other communication circuits through two terminals assigned in advance among said 2n terminals and receives, through remaining two (n−1) terminals, a differential signal stream showing the (n−1) load current values from other (n−1) communication circuits.

3. A power conversion system comprising:

n (n being an integer of 2 or more) power conversion devices connected in parallel to a load; and a communication line connected to said n power conversion devices, each of the power conversion devices including an inverter converting direct-current (DC) power into alternating-current (AC) power and supplying the AC power to said load, a current sensor detecting a load current value, a communication circuit transmitting the load current value detected by said current sensor to each of other (n−1) power conversion devices through said communication line and receiving (n−1) load current values transmitted through said communication line from the other (n−1) power conversion devices, an operation circuit calculating a shared current and a cross current of a corresponding one of the power conversion devices based on the load current value detected by the corresponding current sensor and said (n−1) load current values received by said communication circuit, and a control circuit controlling said inverter such that said shared current is supplied from the corresponding one of the power conversion devices to said load and said cross current is eliminated, wherein each communication circuit transmits a beat signal together with said load current value through said communication line to each of other communication circuits, said operation circuit includes an adder adding the load current value detected by the corresponding current sensor and the (n−1) load current values received by said communication circuit, to obtain a sum of the load current values of the n power conversion devices, an operation unit calculating the number of the power conversion devices under operation based on the beat signal transmitted from each of other communication circuits, a divider (23) dividing the sum of the load current values of said n power conversion devices obtained by said adder by the number of said power conversion devices calculated by said operation unit to obtain a shared current value of each of the power conversion devices, and a subtracter subtracting said shared current value from the load current value detected by said current sensor to obtain said cross current.

* * * * *